United States Patent [19]
Clavel

[11] Patent Number: 5,357,418
[45] Date of Patent: Oct. 18, 1994

[54] HYBRID POWER SUPPLY FOR CONVERTING AN ALTERNATING INPUT SIGNAL INTO A DIRECT OUTPUT SIGNAL

[76] Inventor: Robert Clavel, 3385 Rue Petit, St Hubert, Quebec, Canada, J3Y 3J2

[21] Appl. No.: 694,943

[22] Filed: May 2, 1991

[51] Int. Cl.⁵ .................... H02M 7/217; H02M 3/337
[52] U.S. Cl. ...................... 363/89; 363/24; 323/266
[58] Field of Search ................ 363/24–26, 363/89, 127; 323/266

[56] References Cited

U.S. PATENT DOCUMENTS

| | | | |
|---|---|---|---|
| 3,328,642 | 6/1967 | Haumesser et al. | 317/100 |
| 3,582,714 | 6/1971 | Schmurak et al. | 317/100 |
| 4,004,194 | 1/1977 | Doerflinger et al. | 317/100 |
| 4,060,847 | 11/1977 | Penrod | 361/387 |
| 4,302,717 | 11/1981 | Olla | 323/282 |
| 4,307,440 | 12/1981 | Inoue et al. | 323/266 X |
| 4,523,266 | 6/1985 | Nelson | 363/26 |
| 4,672,527 | 6/1987 | Lagadec et al. | 363/89 |
| 4,679,130 | 7/1987 | Moscovici | 363/17 |
| 4,712,169 | 12/1987 | Albach | 363/89 |
| 4,719,552 | 1/1988 | Albach et al. | 363/44 |
| 4,730,244 | 3/1988 | Zimmerman | 363/49 |
| 4,752,864 | 6/1988 | Clappier | 363/86 |
| 4,763,225 | 8/1988 | Frenkel et al. | 361/388 |
| 4,792,878 | 12/1988 | Buselmeier et al. | 361/383 |
| 4,816,982 | 3/1989 | Severinsky | 363/44 |
| 4,858,071 | 8/1989 | Manabe et al. | 361/386 |
| 4,866,585 | 9/1989 | Das | 363/8 |
| 4,872,102 | 10/1989 | Getter | 363/141 |
| 4,882,664 | 11/1989 | Pennington | 363/127 X |
| 4,893,228 | 1/1990 | Orrick et al. | 363/89 |
| 4,916,380 | 4/1990 | Burroughs | 323/282 |
| 4,922,601 | 5/1990 | Mikolajczak | 29/450 |
| 4,964,029 | 10/1990 | Severinsky et al. | 363/80 |
| 5,029,062 | 7/1991 | Capel | 363/26 |

*Primary Examiner*—Emanuel T. Voeltz
*Attorney, Agent, or Firm*—Collard & Roe

[57] ABSTRACT

The present invention relates to a hybrid power supply for converting an alternating input signal fed to its input into a direct output signal produced at its output. The hybrid power supply comprises a rectifier for converting the alternating input signal into a mono-alternation signal; a capacitor for smoothing the mono-alternation signal into a direct signal; a switching regulator stage coupled to the capacitor for generating a pre-regulated direct signal having a constant amplitude; a 1/X frequency modulating circuit for generating two switching pulsed signals of constant pulse width at a variable frequency according to a 1/X function in relation to the direct signal originating from the capacitor; and a linear regulator stage coupled to the switching regulator stage for regulating the pre-regulated direct signal, and for generating the direct output signal. A 1/X pulse with modulating circuit can also be provided for generating two variable pulse width signals synchronized with the switching pulsed signals for allowing adjustment of the output. Low power dissipation of the power supply elements allow to use an airtight shielding to eliminates interferences.

11 Claims, 8 Drawing Sheets

HYBRID POWER SUPPLY FOR CONVERTING AN ALTERNATING INPUT SIGNAL INTO A DIRECT OUTPUT SIGNAL

FIELD OF THE INVENTION

The present invention relates to a hybrid power supply for converting an alternating input signal fed to its input into a direct output signal produced at its output.

BACKGROUND OF THE INVENTION

Almost all the power supplies on the market are either of a linear type or a switcher type. Linear power supplies have good regulation characteristics but a very low efficiency, large weight, large size, bad isolation from noisy lines and large temperature rises. Switching power supplies, on the other hand, have a good efficiency, low weight, small size, good isolation from line transients, low temperature rises but have usually poor regulation (especially load regulation), large ripple and noise, and large emitted interferences. In addition, the latters are usually more complex and difficult to repair. In order to have the switcher type efficiency and linear type regulation, a natural idea is to combine the two techniques to obtain a hybrid power supply.

However, simply cascading an unregulated switcher with a linear regulator would probably decrease the size and the weight of the supply by eliminating a 60 Hz transformer, but would not increase the efficiency. It could even decrease it as the efficiency of saturating core inverter is usually lower than the 60 Hz transformer efficiency.

U.S. Pat. Nos. 4,679,130 and 4,893,228 show the uses of cascading configuration of a conventional pulse width modulated switching supply with a linear regulator. However, these types of supplies should have some drawbacks as: parasitic oscillations on certain conditions induced in a feedback loop followed by another feedback loop; susceptibility to load transient even if these load variations are somewhat dampened by the linear regulator; high RF noise; and spike content easily transmitted across the linear which has usually poor rejection at high frequency.

U.S. Pat. No. 4,730,244 is an over current protection scheme implemented in the primary circuit of a conventional half bridge pulse width modulated unit. The present supply which will be described, is not a half bridge PWM unit.

Also known in the art there is the U.S. Pat. No. 4,712,169 of Manfred Albach, granted on Dec. 8, 1987, describing a circuit arrangement for forming a direct voltage from a sinusoidal input voltage. This circuit comprises among other elements, a pulse generator responsive to the input voltage to derive switching pulses for a transistor whose frequency is varied uniformly in time between a minimum frequency at the maximum value of a rectified input voltage and a maximum frequency at the minimum value. One drawback with this circuit is that the rectified input voltage must not be regulated even roughly because in that case the voltage to frequency provided in this circuit cannot detect small variations of the input voltage such as ripple signal. However, the main drawback is that it can work only with constant frequency and constant amplitude of the line, which means that no real regulation can be obtained with that circuit. Its purpose, as the inventer state it, is purely to reduce the size of the filtering choke.

An objective of the invention is to provide a power supply with better regulation than the ones known in the art, very reduced ripple and noise voltage, high efficiency, small weight, small size, easy maintenance and low cost.

Another objective of the invention is to provide a current source with better regulation than the ones known in the art, preferentially in view of realizing low weight and volume Ni-Cad battery charger.

SUMMARY OF THE INVENTION

According to the present invention, there is provided a hybrid power supply for converting an alternating input signal fed to its input into a direct output signal produced at its output, said hybrid power supply comprising:

a rectifier for converting said alternating input signal into a mono-alternation signal;

a capacitor for smoothing said mono-alternation signal to a direct signal;

a switching regulator stage coupled to said capacitor for generating a pre-regulated direct signal having a constant amplitude, said switching regulator stage including a high frequency transformer having primary and secondary windings both center tapped, two power transistors having cut-off and conduction states for controlling conduction periods of corresponding sections of said primary winding, and two integrating chokes for converting a high frequency signal generated by said secondary winding into said pre-regulated direct signal;

a 1/X frequency modulating circuit for generating two switching pulsed signals of constant pulse width at a variable frequency according to a 1/X function in relation to said direct signal originating from said capacitor, said switching pulsed signals being 180° phase-shifted one from the other, whereby said switching pulsed signals alternately trigger the states of the power transistors of said switching regulator stage; and a linear regulator stage coupled to said switching regulator stage for regulating said pre-regulated direct signal, and for generating said direct output signal.

Figure 1:
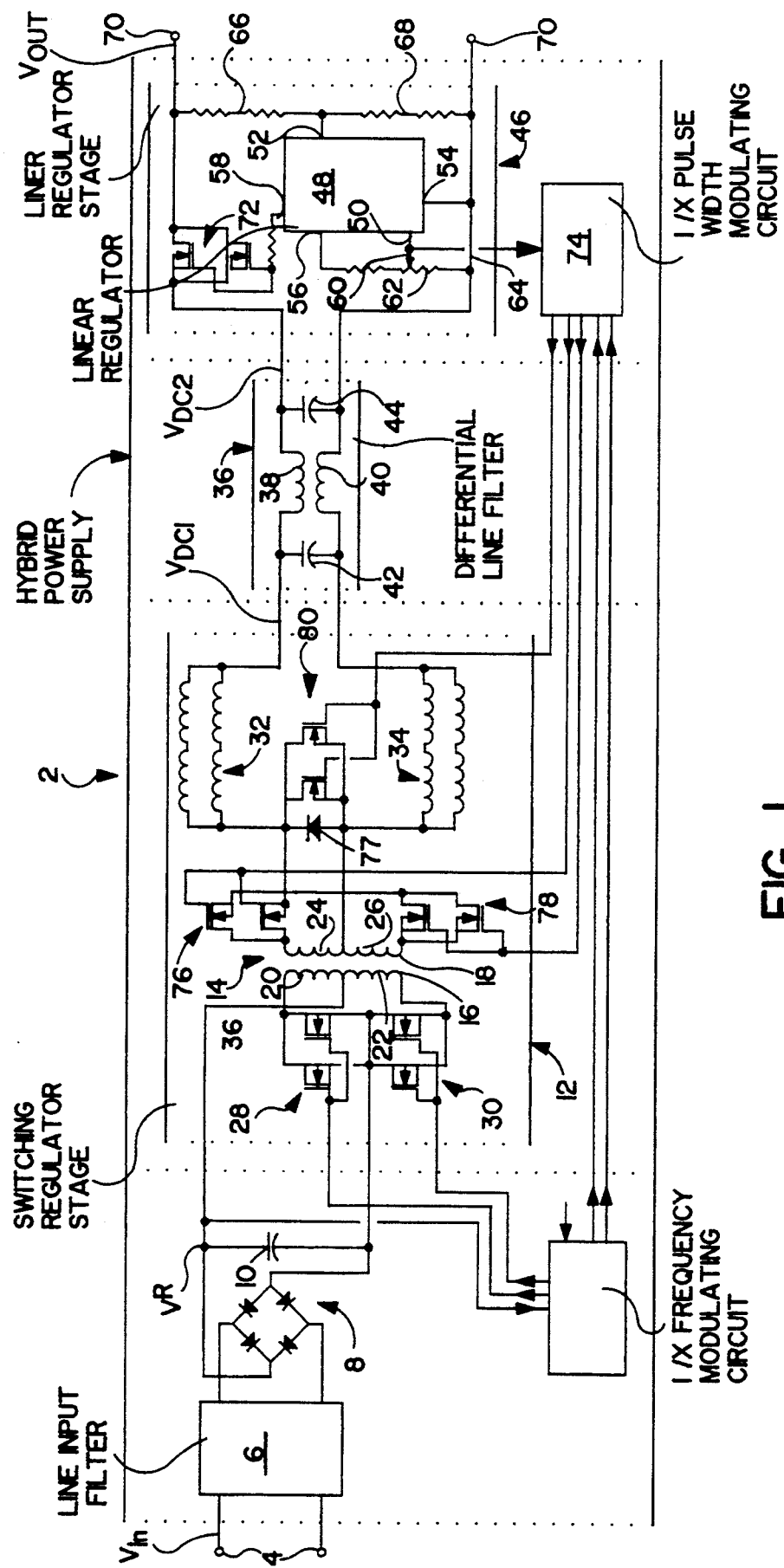
FIG. 1 is a simplified schematic diagram illustrating a hybrid voltage power supply according to the present invention.

A switching regulator stage 12 is coupled to the capacitor 10 for producing a first regulation of the raw DC signal VR into an almost pure DC signal VDC1. The switching regulator stage 12 includes a high frequency ferrite transformer 14 having its primary and secondary windings 16 and 18 center tapped to allow a selective use of the winding sections 20, 22, 24 and 26. For a switching frequency F fixed above 100 kHz, windings 16 and 18 require only a few number of turns. Furthermore, with sufficiently large gauge wires and low induction levels, the efficiency of the transformer 14 can be increased around 99%. The switching is made by two arrangements of N power FETs 28 and 30 controlling conduction periods of respective corresponding sections 20 and 22 of the primary winding 16. Since those power FETs have very low leakage in cut-off state and can handle an extremely fast switching, significant losses occur only during conduction state in the following form:

$$\text{LOSSES} = \frac{RDS \times I^2}{N} \quad (1)$$

where:
RDS is the drain to source resistance;
I is the drain to source current; and
N is the number of FETs in parallel. It can be easily seen from (1) that losses in each FETs can be decreased and substantially equaly shared by putting several FETs in parallel. The high frequency pulsed signal induced in the secondary winding 18 is rectified and averaged by two arrangements of heavy current, low value, high frequency integrating chokes 32 and 34 connected to the tapped section 24 of the secondary winging 18, resulting in an almost pure DC signal VDC1.

As the inductance of the integrating chokes 32 and 34 is proportional to the square of the number of turns, and the DC resistance is proportional to the number of turns, paralleling m chokes in order to get a particular inductance value will decrease the DC resistance and hence losses according to a $\sqrt{m}$ law. Although a large number m of paralleled chokes will theoretically eliminates losses, a reduced number of chokes as 1 to 4, for example, will yield to a satisfactory reduction of losses since a no-loss choke cannot be built in practice, due to imperfections of real elements. The reason to split in two arrangements 32 and 34 the integrating chokes is to suppress ground loop problems that can occur at high frequency. The efficiency of the frequency to DC conversion produced by the arrangements of chokes 32 and 34 is typically around 97% for a 25 A output, since this efficiency is inversely proportional to the number m of paralleled chokes.

To immune the DC signal VDC1 from line variations and ripples into the raw DC signal VR produced by the capacitor 10, a 1/X frequency modulating circuit 36 is provided to control the switching made by the two arrangements of N power FETs 28 and 30. If the transformer 14 has a step down ratio of n, the pulses at the secondary 18 will have an amplitude of VR/n. Now, if the pulses generated by the two arrangements of N power FETs 28 and 30 in the transformer 14 have a constant pulse width PW and are produced at a variable frequency F according to a 1/X function in relation to the raw DC signal VR originating from the capacitor 10, so:

$$F = K1/VR \quad (2)$$

then the resulting voltage VDC1 produced by the integrating chokes will be constant, according to the equation (4):

$$VDC1 = \quad (3)$$

$$\int_O^{PW} \frac{F \times VR}{n} dt = \frac{F \times VR}{n} \int_O^{PW} dt = \frac{F \times VR \times PW}{n}$$

By replacing F by (2) in (3):

$$VDC1 = \frac{K1}{VR} \times \frac{VR}{n} \times PW = \frac{K1 \times PW}{n} = \text{CONSTANT} \quad (4)$$

Basically, the 1/X frequency modulating circuit 36 generates two switching pulsed signals 180° phase-shifted one from the other to drive the gate of the power FETs for alternately triggering the conduction state of the respective arrangements 28 and 30. These two switching pulsed signals are formed by out-of-phase pulses having a constant pulse width produced at a variable frequency F according to the 1/X function. The 1/X frequency modulating circuit can be easily designed to perform the accurate 1/X function within a 1% range of variation, from a ten to one amplitude reduction of the signal at the input, resulting in a 1% efficiency regulation for large line variations. This allows no tap change through universal line inputs from 85 V to 265 V, indifferently AC or DC.

Several advantages are provided by this kind of pre-regulation:
- it is a purely open loop circuit, thus avoiding tricky feedbacks usualy performed by conventional switching regulators which make them hard to analyse and trouble-shoot;
- the two half sections 20 and 22 of the transformer 14 are driven by pulses of substantialy the same duration, thus avoiding dissymmetry effects that plague conventional switchers in sudden saturation of the core or overheating of one transistor in particular;
- by paralleling a sufficiently number N of power FETs in the arrangements 28 and 30, the losses can be decreased until they become negligible, giving to the switching regulator stage 12 an efficiency around 98%; furthermore, each of the power FETs in the arrangements 28 and 30 dissipates very little power, so they require very little heat sinking and operate at very low junction temperature, providing a high reliability to the circuit; and

- as the cost of power FETs has dropped significantly over the past few years, and as they are easy to parallel, a high performance/cost ratio can be obtained.

Since the efficiency of the AC to DC convertion made by the rectifier 8 and the capacitor 10 is around 98% as told before, and since the efficiency of the switching regulator stage 12 is also around 98%, the efficiency of their combination is around 98%×98%=96%. By also combining the chokes effect, the efficiency is approximatively around 97%×96%=93%, which is already largely better than the efficiency of conventional switching regulators usualy in a 50% to 80% range. It can be easily seen that full advantage is taken of the fact that power FETs are much easier to parallel than bi-polar transistors, and that power FETs need almost no driving power as being essentially used as voltage actuated switches.

A differential line filter 36 is coupled to the the switching regulator stage 12 in order to suppress interferences. The differential line filter 36 is made of two coils 38 and 40 connected in series with the respective arrangement of integrating chokes 32 and 34, and two capacitors 42 and 44 disposed on both sides of the two coils 38 and 40. The DC voltage VDC2 outgoing from the differential line filter 36 is a practically pure DC voltage having a ripple component of less than 1 mv. peak-to-peak.

To obtain a power supply 2 with linear regulator characteristics, a linear regulator stage 46 is coupled to the line input filter 36. The IC regulator 48 is provided with two sense inputs 50 and 52, a ground input 54, a voltage reference output 56 delivering a constant DC voltage that can be used as a reference voltage, and an output 58 generating a control signal proportional to the difference of amplitude between the signals at the two sense inputs 50 and 52.

To allow an adjustment of the control signal, the sense input 50 is connected to the adjustable DC signal output 60 of potentiometer 62 connected between the voltage reference output 56 and the ground reference line 64 of the power supply 2. The sense input 52 is fed by a signal indicative of the direct output voltage signal Vout produced by a voltage divider formed of resistors 66 and 68, connected in parallel to the output 70 of the power supply 2. Thus, the IC regulator 48 forms a closed-loop voltage regulator. The output 58 is connected to the gate of the N power FETs 72 connected in series with the output 70 of the power supply 2. This allows a control of the impedance value of the power FETs 72 by the control signal to vary the output characteristics of the power supply 2.

As the input of the linear regulator stage 46 is already regulated within 1%, its efficiency at full load is of the order of 99% and a line regulation efficiency of the order of 0.01% is achieved at heavy load. At light loading condition, this load regulation efficiency would not be achieved because capacitors 42 and 44 of the differential line filter 36 tend to charge up to a peak value well above Vout. The linear regulator 48 will still regulate correctly and the load will hardly notice the phenomenon, because what the load sees is still a linear regulator output. However, if it is desirable to maintain a load regulation of 0.01%, it can be done by using swinging type integrating chokes 32 and 34 (value increasing with low DC component) and by adding a small internal bleeder before the linear regulator stage 46. As the FETs have an excellent high frequency ripple and transient rejection, ripple and noise on Vout are kept in a 1 mv. peak-to-peak range. The total efficiency of the hybrid power supply is around 90% to 95% because of the high efficiency of each stage.

Two sets of N paralleled power FETs 76 and 78 are controlling conduction periods of respective sections 24 and 26 of the secondary winding 18, acting as synchronous rectifiers. In fact, they serve two purposes which are:
- providing a forward voltage drop as wanted by just varying the number of power FETs, the voltage drop being given by equation (1);
- providing means to vary VDC2, thus adjust Vout.

The adjustment of VDC2 is made by a 1/X pulse-width modulating circuit 74 driving two pulsed signals to the gates of the power FETs of corresponding sets 76 and 78. These two pulsed signals are respectively synchronized with corresponding switching pulses signals, and are formed by pulses of variable pulse width according to a 1/X function in relation to the adjustable DC signal at the output 60 of the potentiometer 62. A complementary pulsed signal is also generated by the circuit 74 to drive another set of paralleled power FETs 80 connected between the two arrangements of integrating chokes 32 and 34, acting as a freewheeling diode to produce a low voltage drop between the chokes 32 and 34 during non-conduction periods of the two sets of power FETs 76 and 78. A diode 77 is connected in parallel to the set of power FETs 80 for safety purpose, conducting and dissipating power only during short intervals.

Figure 2:
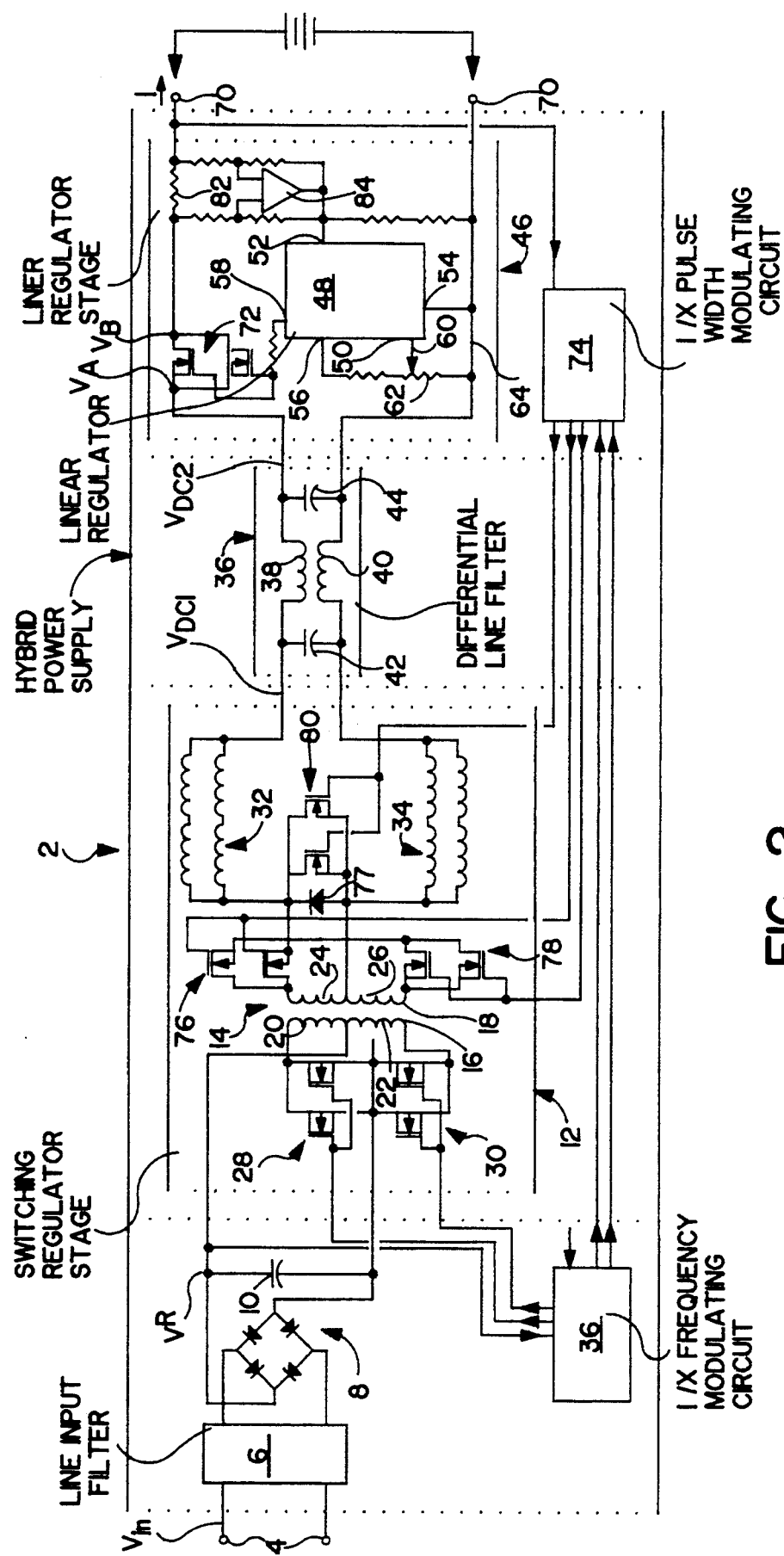
FIG. 2 is a simplified schematic diagram illustrating a hybrid current power supply according to the present invention.

Referring now to FIG. 2, there is shown the simplified schematic diagram of the hybrid current power supply 2. Such a current source can be used among other things to recharge high capacity nickel-cadmium batteries requiring heavy current for fast charge.

The difference with FIG. 1 resides in the fact that the sense input 52 of the IC regulator 48 is fed by a signal indicative of the direct output current signal instead of the direct output voltage signal. A way to realize that is to replace the voltage divider formed by resistors 66 and 68 (shown in FIG. 1) by a low value resistor 82 connected in series with the output 70 generating a small voltage drop representative of the direct output current signal I. An operational amplifier 84 connected in parallel with the resistor 82 amplifies the small voltage drop in order to drive properly the sense input 52.

Thus, the IC regulator 48 forms a closed-loop current regulator, comparing the output current I with the adjustable DC signal and driving the N FETs 72 resistance in order to keep the output current I constant. The output control signal fed to the 1/X pulse width modulating circuit 74 is also modified, being now taken at the output 70 of the power supply 2. In the case where the power supply 2 is used as a battery charger, this output control signal corresponds precisely to the value of the battery voltage. The 1/X pulse width modulating circuit 74 maintains the voltage VA at the input of the power FETs 72 a few hundreds of millivolts above VB, forcing the FETs 72 to operate continuously with low drop and low power dissipation, even at heavy loading currents. Current loading rate is adjusted by the potentiometer 62.

Thus, for the same power output, we have the same kind of efficiency, because the power supply 2 still comprises a 1/X frequency modulating circuit 36 regulating the line, and a 1/X pulse width modulating circuit 74 maintaining the lowest possible drop across the power FETs 72 in all circumstances.

A switch circuit could be easily designed to allow an easy transition of the voltage source shown on FIG. 1 to a current source shown on FIG. 2 by switching appropriate components and connections.

Figure 3:
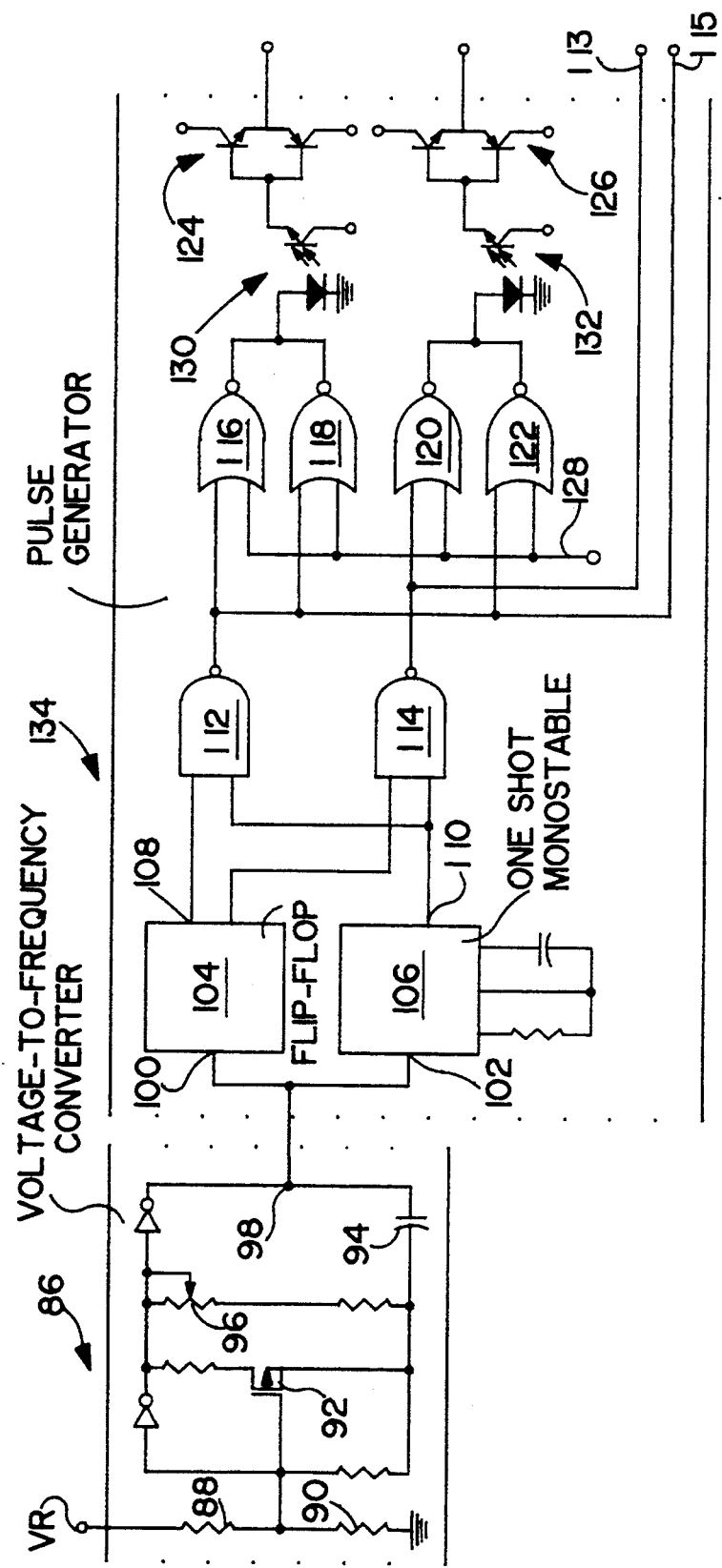
FIG. 3 is a circuit diagram illustrating with more details the 1/X frequency modulating circuit shown in FIGS. 1 and 2.

Referring now to FIG. 3, there is shown with more details the 1/X frequency modulating circuit 36 (shown in FIGS. 1 and 2). A signal is produced at a frequency F that is inversely proportional to the raw DC signal VR across the capacitor 10 (shown in FIGS. 1 and 2) by the voltage-to-frequency converter 86 which is a CD4007 CMOS integrated circuit, abstraction made of the voltage divider formed by resistors 88 and 90. This voltage divider reduces VR by a 10 to 1 ratio in order to properly drive the gate of a P-channel FET 92 operating in its variable resistance mode. When the voltage at the gate of the FET 92 increases, frequency F decreases. When the gate voltage decreases, frequency F increases. The variation law of the frequency F with respect to VR is given by equation (2), within a few percent on a limited range.

The capacitor 94 completes a simple RC oscillator forming a part of the voltage-to-frequency converter 86. Such simple voltage-to-frequency converter 86 can be used when line variations do not exeed ±20% and when low cost is wanted. A potentiometer 96 connected in parallel to the FET 92 allows preliminary adjustment of the voltage-to-frequency relation. Oscillations produced at the output 98 are driven to the pulse generator 134 for triggering the inputs 100 and 102 of a flip-flop 104 and a one-shot multivibrator 106, both producing pulses at their respective outputs 108 and 110.

These pulses are applied to a pair of NAND gates 112 and 114 producing two trigger signals used as logic input signals applied to two pairs of paralleled NOR gates 116, 118 and 120, 122 generating the two respective switching pulsed signals adequately buffered by two push-pull arrangements 124 and 126 of bi-polar transistors before being sent to the corresponding arrangement of power FETs 28 and 30 (shown in FIGS. 1 and 2). The NOR gates 116, 118, 120 and 122 also have inputs connected to an inhibit line 128 that can be used to stop generating these switching pulsed signals. With some types of power FETs, it is necessary to increase reliability by adding two opto-isolators 130 and 132 respectively placed between the two pairs of NOR gates 116, 118, 120 and 122 and the two buffers 124 and 126. Output of the NAND gates 112 and 114 are externally accessible through two outputs 113 and 115 of the pulse generator 134.

Figure 4:
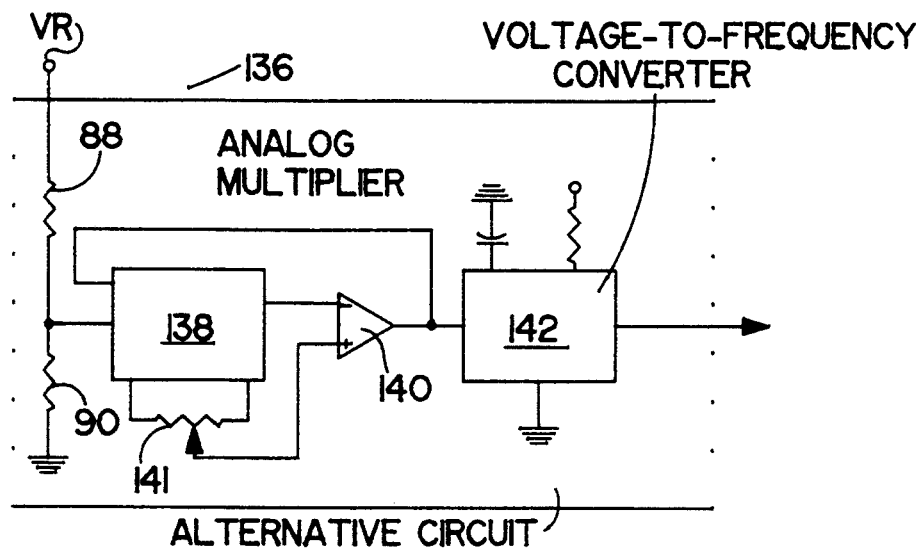
FIGS. 4 and 5 are circuit diagrams illustrating alternative embodiments of the voltage-to-frequency converter shown in FIG. 3.

FIG. 4 show an alternative circuit 136 of the voltage-to-frequency converter 86 illustrated in FIG. 3. The circuit 136 is made of the same 10 to 1 voltage divider formed of the resistors 88 and 90, which now applies a voltage to the MC1594 IC analog multiplier 138 connected with the operational amplifier 140 used as an analog divider realizing the 1/X function. The potentiometer 141 allow adjustment of the division factor. The LM331 IC voltage-to-frequency converter 142 is connected to the output of the operational amplifier 140 to generate the oscillations applied to the pulse generator 134 (shown in FIG. 3). Such voltage to frequency converter 136 would be used when line variations exceed ±20%, as a line varying from 85 V.AC to 265 V.AC for example. The quality of the 1/X function is also much better.

Figure 5:
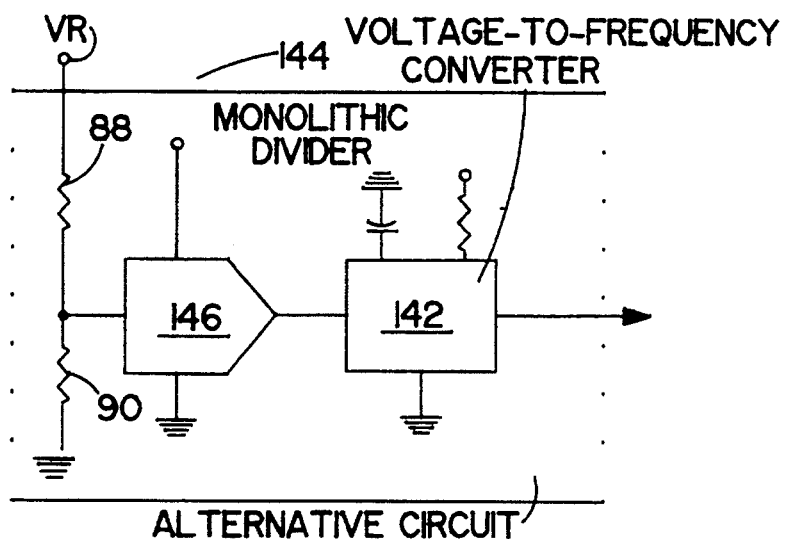

FIG. 5 shows another alternative circuit 144 for replacing the voltage-to-frequency converter 86. The only difference with the one shown in FIG. 4 is that the divider part components 138, 140 and 141 of FIG. 4 are replaced by the AD532 monolithic IC divider 146, producing the same result. Of course, other circuit could be used to realize the 1/X frequency modulating circuit, as a microprocessor for exemple.

Figure 6:
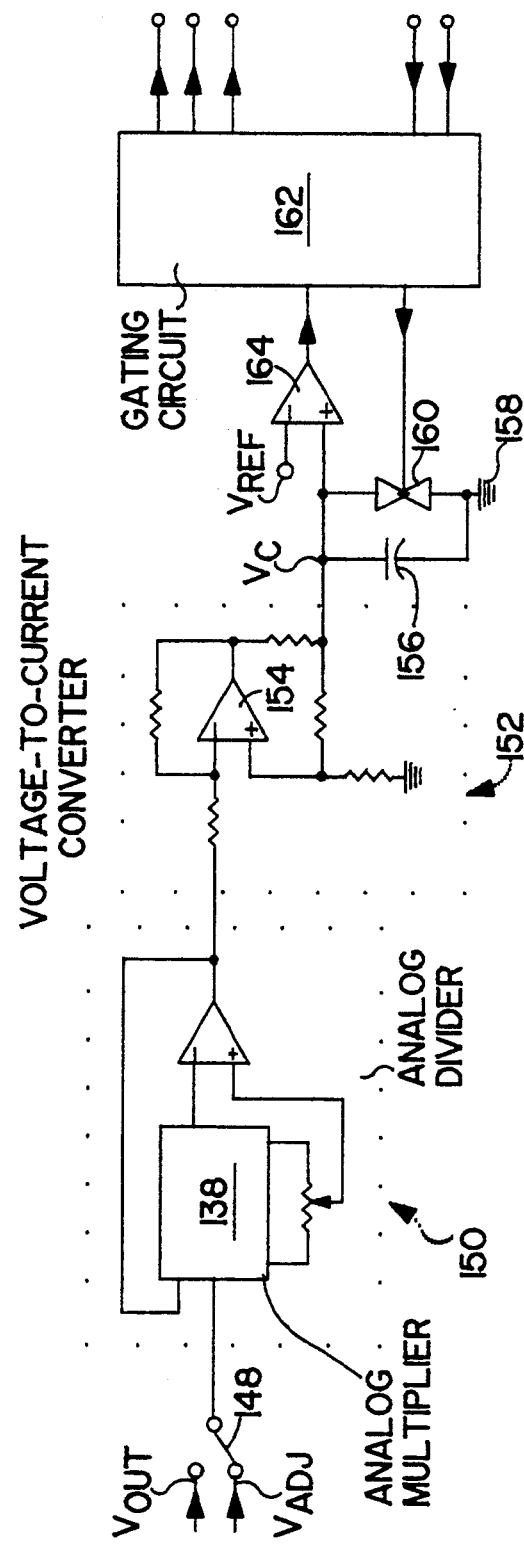
FIG. 6 a is circuit diagram illustrating the 1/X pulse width modulating circuit shown in FIGS. 1 and 2.

Referring now to FIG. 6, there is shown with more details the 1/X pulse width modulating circuit 74 (shown on FIGS. 1 and 2). The switch 148 selects whether $V_{ADJ}$ when used as a voltage source or Vout when used as a current source. The switch is connected to the analog divider 150 which is of the same type as any of those shown in FIGS. 4 and 5. This analog divider 150 generates a voltage output signal according to a 1/X function in relation to its input signal $V_{ADJ}$ or Vout. The voltage output signal is converted into a current signal by the voltage-to-current converter 152 simply made with the operational amplifier 154 and an adequate arrangement of resistors. Voltage Vc across the capacitor 156 connected between the output of the voltage-to-current converter 152 and a ground 158 is initially closed to the ground potential since the bi-directional switch 160 connected in parallel to the capacitor 156 is shorting it. A synchronization signal coming from the gating circuit 162 is fed to the control input of the switch 160 for triggering it close or open. When the switch is opened, the capacitor 156 charges up linearly under constant current provided by the voltage-to-current converter 152 according to the equation (5):

$$V_c = \frac{1}{C} \int I\, dt = \frac{1}{C} \times I \times t \quad (5)$$

I is the current flowing across the capacitor 156;

t is the charging time interval; and $V_c$ is the voltage difference across the capacitor 156 during the charging time interval.

The comparator 164 compares $V_c$ fed at its positive input to a preset voltage $V_{REF}$ fed at its negative input. When $V_c$ reaches the voltage $V_{REF}$, the output of the comparator 164 changes state after a time interval t according to the equation (6):

$$t = \frac{V_{ref} \times C}{I} \quad (6)$$

Since I is inversely proportional to the input voltage Vout or $V_{ADJ}$ of the 1/X pulse-width modulating circuit 74 and that $V_{ref}C$ is a constant value, then the time interval t and the pulse width of the pulses generated by the comparator 164 will be, according to the equation (7):

$$t = K_2 \times V_{out}\, or\, t = K_2 \times V_{ADJ} \quad (7)$$

The gating circuit 162 includes an arrangement of logic gates, opto-isolators, and other appropriate elements to generate from the pulses produced by the comparator 164 the two pulsed signals driving the gates of the respective power FETs 76 and 78 (shown in FIGS. 1 and 2), and the complementary pulsed signal driving the gates of the power FETs 80 (shown in FIGS. 1 and 2) acting as a free wheeling diode. The gating circuit 162 also generates the synchronization signal triggering the switch 160. This synchronisation signal is derived from the combination of the two trigger signals incoming at inputs of the gating circuit from the outputs 113 and 115 of the pulse generator 134 (shown in FIG. 3).

Figure 7:
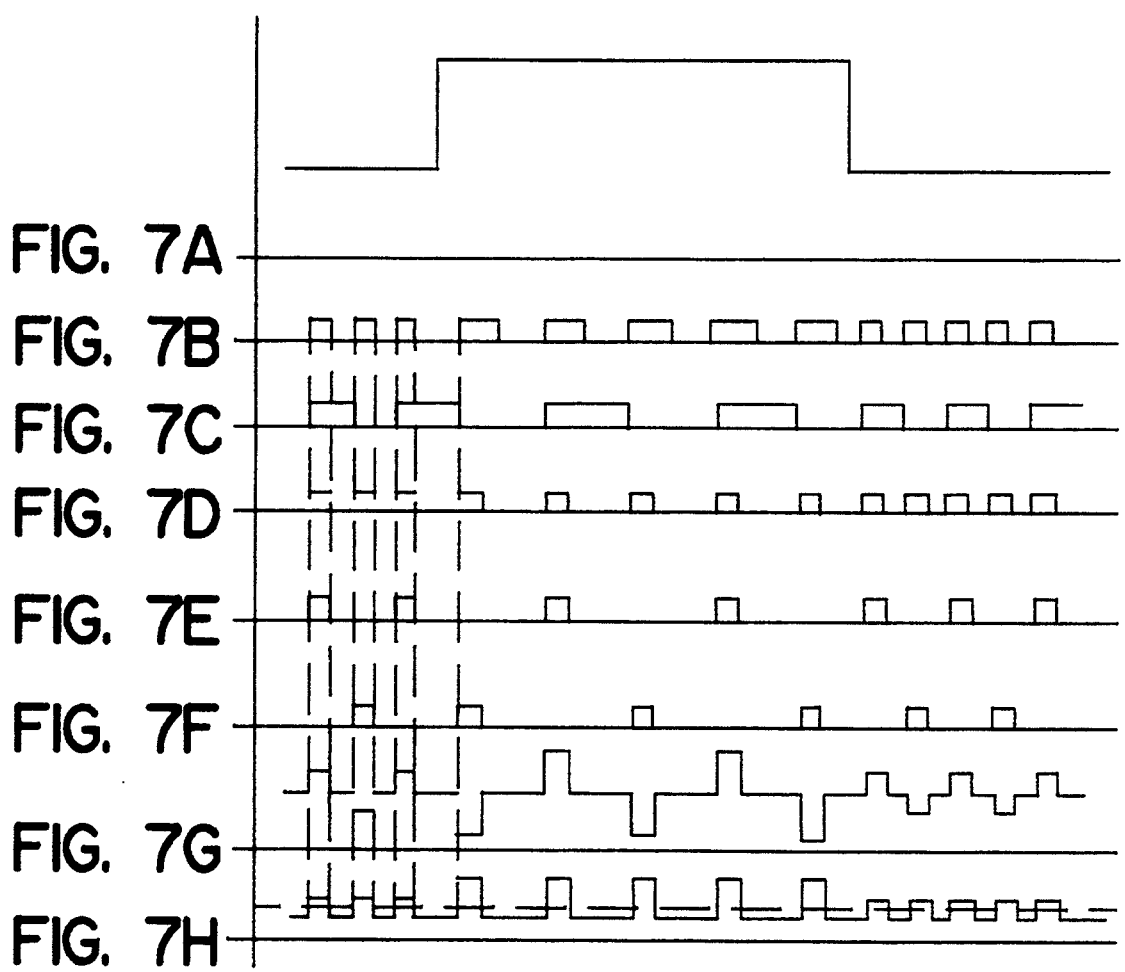
FIG. 7 is a timing diagram illustrating signals appearing at different points in the hybrid power supply shown in FIG. 1.

FIG. 7 shows the voltage and pulse pattern relationship at different points of the hybrid power supply circuit 2:
- "A" represents a possible raw DC voltage VR across the capacitor 10 (shown in FIGS. 1 and 2) showing hypothetical large variations (100 VDC to 200 VDC for example);
- "B" represents the frequency modulation in the oscillations generated by the voltage-to-frequency converter 86, 136 or 144 (shown in FIGS. 3, 4 and 5) according to the raw DC voltage VR of "A";
- "C" represents the output 108 of the flip-flop 104 (shown in FIG. 3) according to the oscillations of "B";
- "D" represents the output 110 of the one-shot multivibrator 106 (shown in FIG. 3) according to the oscillations of "B";
- "E" represents the switching pulsed signal generated going from the NAND gate 112 (shown in FIG. 3) according to the oscillations of "B";
- "F" represents the swithcing pulsed signal generated from the NAND gate 114 (shown in FIG. 3) according to the oscillations of "B";
- "G" represents the high frequency pulsed signal induced in the secondary winding 18 (shown in FIGS. 1 and 2) according to the above mentioned signals; and
- "H" represents the signal generated from the FETs 76 and 78 acting as synchronous rectifiers (shown in FIGS. 1 and 2) according to the above mentionned signals.

Figure 8:
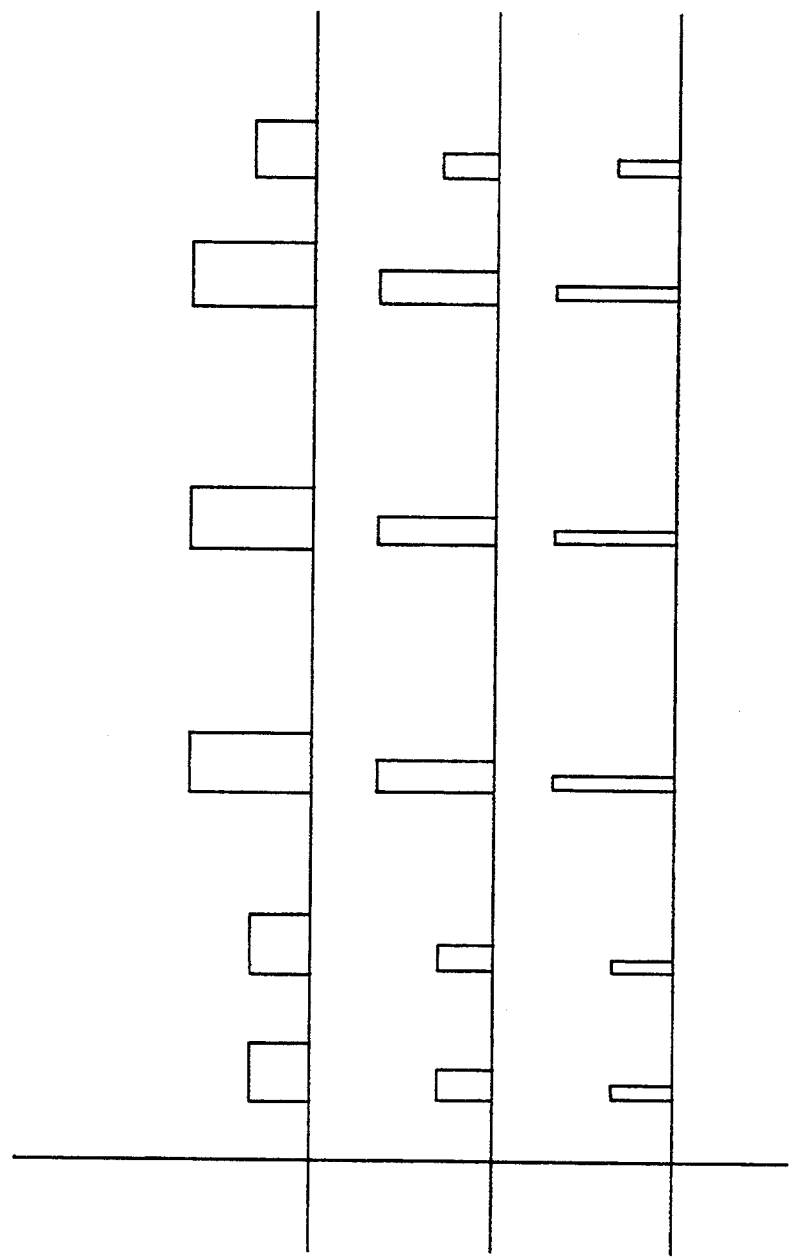
FIG. 8 is a timing diagram illustrating signals appearing at the output of the switching pre-regulator stage shown in FIGS. 1 and 2 with respect to different amplitudes of the output control signal.

FIG. 8 shows the combined effect of the 1/X frequency modulating circuit 36 (shown in FIGS. 1 and 2) and the 1/X pulse width modulating circuit 74 (shown in FIGS. 1 and 2) on the waveforms present between the power FETs 76 and 78 and the arrangements of integrating chokes 32 and 34 (shown in FIGS. 1 and 2). Three kinds of modulation can be seen in FIG. 8:
- a modulation of amplitude according to the line voltage;
- a frequency modulation, the frequency being inversely proportional to the line voltage; and
- a pulse width modulation according to $V_{ADJ}$ when the power supply is used as a voltage source, or to Vout when the power supply is used as a current source.

The net effect of these three modulations are to produce, after averaging, a DC voltage which is normally only 1% to 2% above the desired output voltage of the power supply in any circumstances, thus allowing the linear regulator to work with efficiencies of 98% to 99%, with very small input variations and hence very high quality of regulation.

Figure 9:
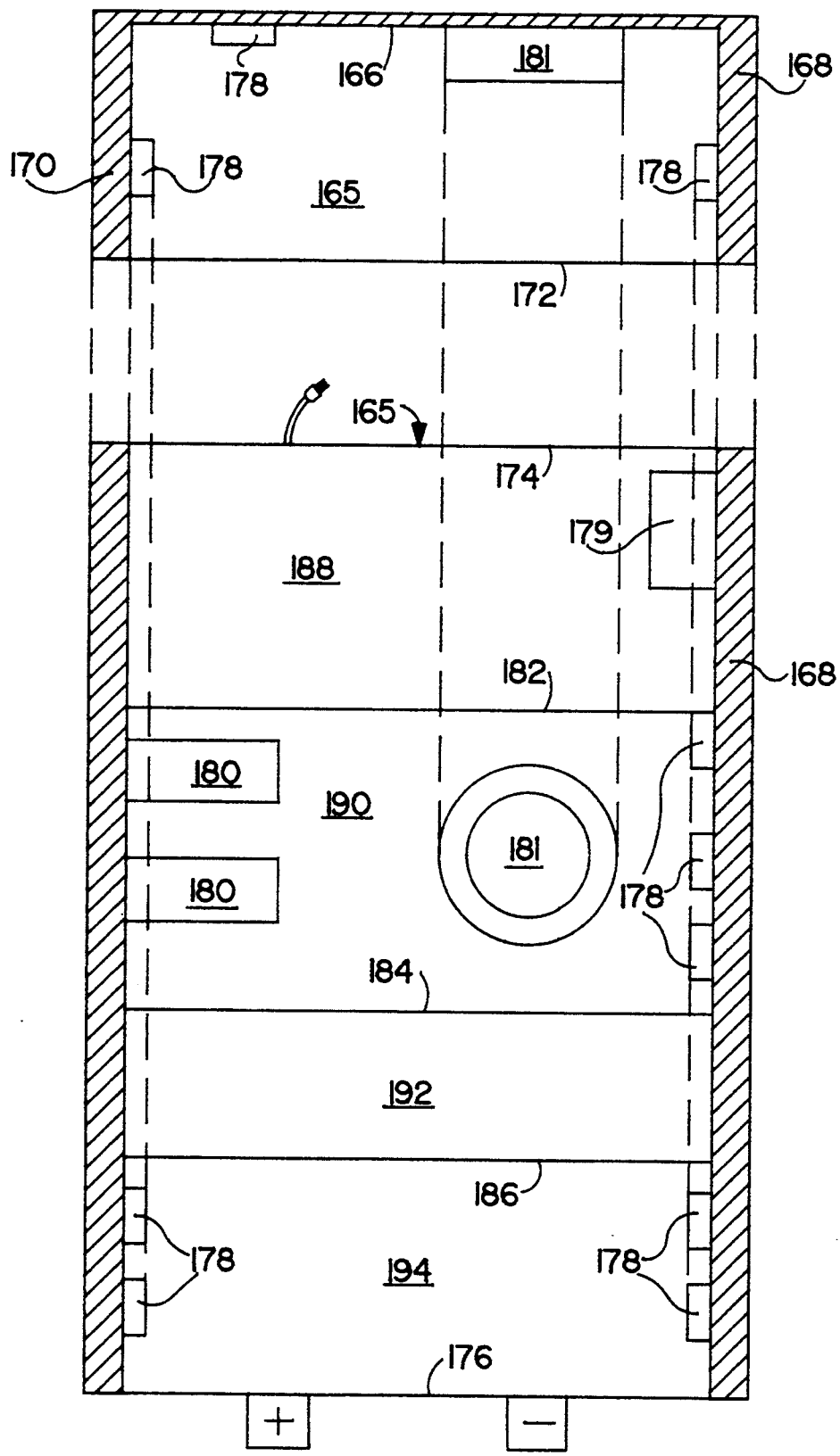
FIG. 9 is a top and a side view of the hybrid power supply according to the present invention, Referring to FIG. 1, there is shown the simplified schematic diagram illustrating the hybrid voltage power supply 2 in accordance to the present invention. The input 4 of the power supply 2 can be provided with suitable connecting terminals for receiving the alternating signal from the sector supply line of 115 volt AC or 220 volt AC. Such terminals are also provided at the output 70. This alternating signal is converted into a raw DC signal VR by a conventional circuit, i.e. a line input filter 6 connected to the input 4, followed by a bridge rectifier 8 converting the incoming filtered signal into a mono-alternation signal, and finally a high voltage capacitor 10 smoothing the mono-alternation signal into the raw DC signal VR. Such AC to DC conversion has usually an efficiency around 98%.

Referring now to FIG. 9, there is shown the construction details of the present power supply. These construction details are concerned with the shielding of the present constant voltage or current power supply, and the mounting of the components. Both radiated interferences and conducted interferences must be eliminated in order that this type of power supply has regulating caracteristics equivalent to a linear supply. The very high efficiency of this power supply makes it possible. The airtight housing 165 of the supply consists of a top extrusion 166, two side extrusions 168 and 170, a bottom plate 172, and two end plates 174 and 176.

All heat dissipative components 178, 179, 180 and 181 are mounted on the top and side extrusions 166, 168, 170 through 1° C./watt thermal resistance material as mica or beryllium oxyde thermal grease for example. The total power to dissipate is roughly split as follows:
50% on top extrusion 166;
25% on side extrusion 168; and
25% on side extrusion 170.

If extrusion 11498 Thermalloy is used for the top extrusion 166 (0.6° C./watt for 12 in length), and extrusion 14811 Thermalloy is used for side extrusions 168 and 170 (1.25° C./watt) for 12 in. length, the temperature rise of the housing will be about 10° C. above external ambient. Temperature of each dissipative device will be a few degrees above "sink", i.e. housing. In these conditions, it can be shown experimentally that the ambient temperature inside the supply is going to be only a few degrees above housing temperature. Hence, no internal ventilation is necessary and no aperture needed in the airtight housing 165 of the power supply. It is very important that no aperture is needed because, in this case, little or no RFI can escape in the surrounding from the top or sides extrusions 166, 168 and 170.

Moreover, the supply housing 165 also have three internal shields 182, 184 and 186 disposed in parallel, dividing the housing 165 in four separated sections 188, 190, 192 and 194 according to the following pattern:
- a first input section 188 is located at the extremity of the housing 165 and encloses the line input filter, the bridge rectifier, the capacitor and the 1/X frequency modulating circuit;
- a second section 190 is located next to the first one 188 and encloses the switching regulator stage;
- a third section 192 is located next to the second one 190 and encloses the differential line filter; and
- a fourth output section 194 is located at the other extremity of the housing 165 and encloses the 1/X pulse width modulating circuit and the linear regulator stage.

Therefore, the high frequency transformer mounted in the center of the power supply is shielded from the first input section 188 by the shield 182, and shielded from the differential line filter by the shield 184, and the linear regulator stage is shielded from the differential line filter by the shield 186.

Suitable openings allow components connections between to adjacent sections, while the end plates are provided with the above mentionned terminals connected respectively to the input and the output of the hybrid power supply.

Little or no RFI can be induced in the wirings of the two end sections 188 and 194, or radiated through end plates 174 and 176.

In addition, the differential line filter, is fully balanced and eliminates common mode and ground loop conducted RFI.

As will be shown on a simple example, this new kind of Power Supply is several times better than conventional linears or conventional switchers on the market.
1- WEIGHT & VOLUME
a) Efficiency, by definition, is:

$$E = \frac{Pout}{Pin}$$

The Power dissipated in the Power Supply is then:

$$Pd = Pin - Pout = \frac{Pout}{E} - Pout = Pout\left(\frac{1}{E} - 1\right)$$

The latter formula suggests that if the efficiency is 3 times higher, the power dissipating Pd decreases by a factor much higher than 3.

For example, if Pout=300 watts (15 VDC×20A):
- if E=0.3 (30% efficiency)

$$Pd = 300\left(\frac{1}{.3} - 1\right) = 300(2.33) = 699 \text{ watts}$$

- if E=0.9 (90% efficiency)

$$Pd = 300\left(\frac{1}{.9} - 1\right) = 300(.11) = 33 \text{ watts}$$

In other words, when efficiency improves by a factor 3, power dissipation Pd in the power supply decreases by a factor:

$$\frac{699}{33} = 21$$

Applying the same formula, one could show that when efficiency increases from 90% to 95%, Pd would decrease by a factor of about 50%.

b) Let's now consider what heat sinking is necessary to provide a certain temperature rise above ambient assuming natural convection and all dissipative components mounted on the same extrusion.

If we take a commercial extrusion, with a certain $\theta$sa, the temperature rise above ambient is going to be:

$$Tr = Pd \times \theta sa$$

If Pd doubles, we must halve $\theta$sa, in order to keep the same Tr.

However, in order to halve $\theta$sa, we must increase the length of the extrusion by a factor 4, not 2, as is underlined in the extrusions data sheets.

Hence, the length, the volume, and the weight of the extrusion is going to vary like:

$$\left(\frac{1}{E} - 1\right)^2, \text{ not } \left(\frac{1}{E} - 1\right).$$

- for 90% efficiency, $$\left(\frac{1}{E} - 1\right)^2 = .012$$

- for 30% efficiency, $$\left(\frac{1}{E} - 1\right)^2 = 5.42$$

The effect of increasing efficiency even a few percent, on weight and size is enormous.

In fact, it was found that 90 watts/pound and 5 watts/in$^3$ are feasible with this technique, especially if custom chips can be made.

Compared to a conventionnal convection cooled switcher (average 40 watts/pound and 2.0 watts/in$^3$) this is equivalent or better as far as weight and volume are concerned, and 10 to 100 times better as far as regulation and ripple are concerned, as no switcher has been able until now to produce truly linear quality of regulation.

Compared to a conventionnal convection cooled linear (average 10 watts/pound and 0.5 watts/in$^3$) this is equivalent or better as far regulation and ripple are concerned, about 10 times lighter and about 10 times smaller.

2- RFI

FIG. 9 shows the basic construction details of the power supply housing.

All dissipative components, including chokes and transformers are thermally bound to the extrusions that form the sides and top of the power supply.

In addition, all sections are internally shielded from each other.

Hence nearly all the heat generated is directly transfered to the external ambient via the top and side extrusions. Average temperature inside of the supply is only a few degrees higher than the housing temperature. No aperture for air circulation is needed, and almost no RFI can get through open holes.

This is an important advantage over conventional switchers that are either of the open frame, open PCB, or apertured housings and cooling fans, and are prone to heavy RFI transmission.

3- RELIABILITY

The line pre-regulation and the synchronous rectifiers pulse width monitoring are essentially "open loop" regulating circuits, which are inherently immune to instability.

The linear regulator portion which provides the precision regulation is in fact a FET low drop out regulator, which is unconditionnaly stable due to its less than unity gain.

Moreover, each FET in the different parallel arrangements dissipate only a few watts, which allows to operate much below its maximum junction temperature.

4- COST

The number of components in this new type of supply is about the same as in a conventionnal switcher, i.e. the number of components is higher than in a conventionnal linear.

However the cost of these components (Power FETs, integrated circuits, high frequency cores, etc ... ) is droping much faster than the cost of 60 Hz magnetic components and bi-polars.

In addition, the 1/X function circuits can easily be put on a chip.

Based on the experience of the inventor with a few prototypes, the cost per regulated watt is fairly competitive with much less well regulated switchers or much heavier on hotter linears.

5- FLEXIBILITY

The efficiency of such a supply can be increased at will by increasing the number of FETs and RF chokes in parallel (with however a maximum efficiency around 95%).

One can also make a trade-off between efficiency and simplicity: for example, if fixed output (non adjustable)

supply is wanted, synchronous rectifiers could be replaced by schottky rectifiers.

Multi-output power supplies, with common pre-regulator circuit and independant pulse width controls and linear regulator are particularly easy to implement.

Although, the present invention has been explained hereinabove by way of a preferred embodiment thereof, it should be pointed out that any modifications to this preferred embodiment, within the scope of the appended claims is not deemed to change or alter the nature and scope of the present invention.

We claim:

1. A hybrid power supply for converting an alternating input signal fed to its input into a direct output signal produced at its output, said hybrid power supply comprising:
    a rectifier for converting said alternating input signal into a mono-alternation signal;
    a capacitor for smoothing said mono-alternation signal into a direct signal;
    a switching regulator stage coupled to said capacitor for generating a pre-regulated direct signal having a constant amplitude, said switching regulator stage including a high frequency transformer having primary and secondary windings both center tapped, two power transistors having cut-off and conduction states for controlling conduction periods of corresponding sections of said primary winding, and two integrating chokes for converting a high frequency signal generated by said secondary winding to said pre-regulated direct signal;
    a 1/X frequency modulating circuit for generating two switching pulsed signals of constant pulse width at a variable frequency according to a 1/X function in relation to said direct signal originating from said capacitor, said switching pulsed signals being 180° phase-shifted one from the other, whereby said switching pulsed signals alternatively trigger the states of the power transistors of said switching regulator stage;
    a linear regulator stage coupled to said switching regulator stage for regulating said pre-regulated direct signal, and for generating said direct output signal; and
    a differential line filter coupled between said switching regulator stage and linear regulator stage.

2. A hybrid power supply according to claim 1, further comprising a 1/X pulse width modulating circuit for generating two pulsed signals of variable pulse width and a complementary pulsed signal, both of said pulsed signals of variable pulse width being respectively synchronized by trigger signals derived from said switching pulsed signals, said pulsed signal of variable pulse width triggering states of first and second power transistors having cut-off and conduction states that control conduction periods of corresponding sections of said secondary winding, said variable pulse width being modulated according to a 1/X function in relation to an output control signal, said complementary pulsed signal triggering states of a third power transistor having cut-off and conduction states for producing a low voltage drop between said integrating chokes during non-conduction periods of said first and second power transistors, whereby the constant amplitude of the pre-regulated direct signal produced by said switching regulator stage can be varied.

3. A hybrid power supply according to claim 2, wherein said linear regulator stage comprises:
    a regulator circuit having a first input receiving an adjustable direct signal, a second input receiving a signal indicative of the direct output signal, a voltage reference output for delivering a constant direct voltage signal, and an output generating a control signal proportional to an amplitude difference between said adjustable direct signal and said signal indicative of the direct output signal;
    a variable voltage means having an input connected to said voltage reference output, and an output connected to the first input of said regulator for generating said adjustable direct signal; and
    a power transistor connected in series with the output of said hybrid power supply, said power transistor having an impedance value controlled by said control signal, whereby output characteristics of said hybrid power supply can be modified.

4. A hybrid power supply according to claim 3, wherein said signal indicative of the direct output signal is generated by a voltage divider connected in parallel with the output of said hybrid power supply, said output control signal being the adjustable direct signal provided by said variable voltage means, whereby said direct output signal is a constant direct voltage signal.

5. A hybrid power supply according to claim 3, wherein said signal indicative of the direct output signal is generated by an operationnal amplifier connected in parallel with a low value resistor connected in series with the output of said hybrid power supply, said output control signal being the direct output signal generated by said hybrid power supply, whereby said direct output signal is a constant direct current signal.

6. A hybrid power supply according to claim 3, wherein said 1/X frequency modulating circuit comprises:
    a voltage-to-frequency converter having an input connected to said capacitor, and an output, for generating a signal at said variable frequency which is representative of the direct signal across said capacitor; and
    a pulse generator for generating said two switching pulsed signals, said pulse generator including a flip-flop and a one-shot multivibrator both connected to the output of said voltage-to-frequency converter, for producing pulses varying with rises and decreases of the signal produced by said voltage-to-frequency converter, an arrangement of logic gates and two buffers being connected to outputs of said flip-flop and said one-shot multivibrator for properly gating said pulses and generating said two switching pulsed signals.

7. A hybrid power supply according to claim 6, wherein said 1/X pulse width modulating circuit comprises:
    an analog divider having an input receiving said output control signal and an output for generating a voltage output signal according to said 1/X function in relation to said output control signal;
    a voltage-to-current converter for converting the voltage output signal of said analog divider to a current signal generated at its output;
    a capacitor having an end connected to the output of said voltage-to-current converter, and a second end connected to a ground;
    a bi-directional switch connected in parallel with said capacitor for shorting said capacitor when a synchronisation signal is fed at its control input;

a comparator having an inverting input receiving a reference signal, a non-inverting input connected to the output of said voltage-to-current converter and an output for generating pulses at said variable pulse width when voltage at its second input exceeds said reference signal; and a gating circuit for receiving said trigger signals and generating said synchronisation signal, and for producing said two pulsed signals of variable pulse width and said complementary pulsed signal derived from pulses generated by said comparator.

8. A hybrid power supply according to claim 7, wherein said power transistors are field effect transistors and can be paralleled with other field effect transistors, whereby heat dissipation of each said power transistors is reduced.

9. A hybrid power supply according to claim 8 further comprising:

a line input filter coupled between the input of said hybrid power supply and said rectifier.

10. A hybrid power supply according to claim 9, further comprising an airtight housing formed of a top plate, two side plates, a bottom plate and two end plates, said housing also having three internal shielding plates disposed in parallel for dividing said housing in four separated sections, a first of said sections being located at an extremity of said housing and enclosing said line input filter, said rectifier, said capacitor and said 1/X frequency modulating circuit, a second of said sections being disposed next to said first section and enclosing said switching regulator stage, a third of said sections being disposed next to said second section and enclosing said differential filter, and the fourth section being disposed at an extremity of said housing opposite to said first section and enclosing said 1/X pulse width modulating circuit and said linear regulator stage, all heat dissipative elements of said hybrid power supply being mounted on said top and side plates through a thermal resistance material, said shielding plates having suitable openings allowing connections between adjacent sections, said end plates being both provided with a pair of terminals connected respectively to the input and the output of said hybrid power supply, whereby radiated interferences and conducted interferences emitted outside said housing are reduced to minimum.

11. A hybrid power supply for converting an alternating input signal fed to its input into a direct output signal produced at its output, said hybrid power supply comprising:

a rectifier for converting said alternating input signal into a mono-alternation signal;

a capacitor for smoothing said mono-alternation signal into a direct signal;

a switching regulator stage coupled to said capacitor for generating a pre-regulated direct signal having a constant amplitude, said switching regulator stage including a high frequency transformer having primary and secondary windings both center tapped, two power transistors having cut-off and conduction states for controlling conduction periods of corresponding sections of said primary winding, and two integrating chokes for converting a high frequency signal generated by said secondary winding to said pre-regulated direct signal;

a 1/X frequency modulating circuit for generating two switching pulsed signals of constant pulse width at a variable frequency according to a 1/X function in relation to said direct signal originating from said capacitor, said switching pulsed signals being 180° phase-shifted one from the other, whereby said switching pulsed signals alternatively trigger the states of the power transistors of said switching regulator stage;

a linear regulator stage coupled to said switching regulator stage for regulating said pre-regulated direct signal and for generating said direct output signal;

a 1/X pulse width modulating circuit for generating two pulsed signals of variable pulse width and a complementary pulsed signal, both of said pulsed signals of variable pulse width being respectively synchronized by trigger signals derived from said switching pulsed signals, said pulsed signal of variable pulse width triggering states of first and second power transistors having cut-off and conduction states that control conduction periods of corresponding sections of said secondary winding, said variable pulse width being modulated according to a 1/X function in relation to an output control signal, said complementary pulsed signal triggering states of a third power transistor having cut-off and conduction states for producing a low voltage drop between said integrating chokes during non-conduction periods of said first and second power transistors, whereby the constant amplitude of the pre-regulated direct signal produced by said switching regulator stage can be varied;

a line input filter coupled between the input of said hybrid power supply and said rectifier; and a differential line filter coupled between said switching regulator stage and linear regulator stage.

* * * * *